United States Patent
Parraga Garcia

Patent Number: 5,445,580
Date of Patent: Aug. 29, 1995

[54] STEPLESS TRANSMISSION

[76] Inventor: Julian Parraga Garcia, C/-Agustin Querol no. 8, 28014 Madrid, Spain

[21] Appl. No.: 961,700
[22] PCT Filed: May 26, 1992
[86] PCT No.: PCT/ES92/00046
 § 371 Date: Mar. 29, 1993
 § 102(e) Date: Mar. 29, 1993
[87] PCT Pub. No.: WO92/21896
 PCT Pub. Date: Dec. 10, 1992

[30] Foreign Application Priority Data
May 31, 1991 [ES] Spain ................... 9101327

[51] Int. Cl.⁶ .......................... F16H 9/26
[52] U.S. Cl. ................................ 477/211
[58] Field of Search .......... 475/207, 210, 211, 200, 475/206

[56] References Cited

U.S. PATENT DOCUMENTS

| | | | |
|---|---|---|---|
| 3,128,636 | 4/1964 | Graybill | 475/211 X |
| 4,136,581 | 1/1979 | Winter et al. | 475/210 OR |
| 4,353,270 | 10/1982 | Falzoni | 475/210 X |
| 4,470,326 | 9/1984 | Schmidt | |
| 4,599,916 | 7/1986 | Hirosawa | 475/210 OR |
| 4,624,153 | 11/1986 | Itoh et al. | 475/211 X |
| 4,627,308 | 12/1986 | Moroto et al. | 475/210 OR |
| 4,706,518 | 11/1987 | Moroto et al. | 475/210 OR |
| 4,864,889 | 9/1989 | Sakakibara et al. | 475/211 OR |
| 5,055,094 | 10/1991 | Cataldo | 475/207 X |

FOREIGN PATENT DOCUMENTS

| | | |
|---|---|---|
| 0147646 | 7/1985 | European Pat. Off. |
| 3538343 | 5/1986 | Germany |
| 700783 | 12/1953 | United Kingdom |
| 2115091 | 9/1983 | United Kingdom |

Primary Examiner—Dirk Wright
Attorney, Agent, or Firm—Wigman, Cohen, Leitner & Myers

[57] ABSTRACT

Mechanical stepless transmission comprising, at least, a pair of trunco-conical pulleys with flexible transmission element or elements, a power transmission mechanism and one oulet planetary gear. One of the pulleys is connected to the stepless transmission input shaft and the other one is connected to the power transmission mechanism input shaft. The output shaft of the power transmission mechanism operates one of the planetary gear elements (satellites carrier, sun or crown gear). The other two elements of this planetary gear are connected, one of them to the input shaft and the other one to the stepless transmission output shaft, the last one constitutes, preferably, the input shaft of a stepped conventional gearbox. Preferably, the power trsnmission mechanism will consist in an intermediate planetary gear.

This invention is specially intended for motor vehicles.

9 Claims, 9 Drawing Sheets

STEPLESS TRANSMISSION

FIELD OF THE INVENTION

The present invention relates to a stepless transmission, specially intended for motor vehicles and it is designed in such a way, to allow to increase considerably the amount of power to be transmitted with respect to the conventional stepless tramsmissions.

BACKGROUND OF THE INVENTION

At present, some stepless transimission mechanisms are known, that basically consist on a pair of pulleys mounted on parallel shafts and the movement transmission between them is obtained by means of a trapezoidal cross section belt. Each one of these pulleys is constituted by two interlocked coaxial trunco-conical plates or pieces, which their internal face to face shapes are of trunco-conical configuration. The trunco-conical plates and pieces of each pulley can be shifted between them, moving away or aproaching, modifying in this manner the annular zones where the belt will be supported. When aproaching, the trunco-conical plates or pieces of each pulley, the radii of the annular zones where the belts lie will be increased. On the other way, when moving away, the trunco-conical plates or pieces of each pulley, the contrary is obtained. These radii variations in the pulleys permit to obtain a continuous variation of the transmision ratio.

Based on the stepless transmission idea, the dutch Company DAF, released to the market (possibly at the beginning of the second half of the century) its passenger car DAF-44, equipped with a stepless transmission (Variomatic) developped by his inventor Mr. Doorne and the above Company.

Recently, FIAT released its passenger car FIAT UNO SELECTA and FORD its own passenger car FORD FIESTA CTX. Both models are equipped with stepless transmission or continuous variation transmissions and both mechanisms, which are based on the trunco-conical pulleys already described above and on a special ""belt"" developed among FORD, FIAT AND VAN DOORNE TRANSMISSIE. The above "belt" is made of steel sheetings mounted on flexible straps constituted by ring links, also flexible.

At last and very recently, LANCIA Company has released to the market its model Y 10 SELECTRONIC, also equipped with a stepless transmission based on the same elements used on the above mentioned motor vehicles.

It is interesting to outline that the metallic "belt", above described, has overcome the main problem of the conventional "belt", made of rubber or elastomeric materials with or without reinforcements trends, that is the low value Of the peak power that could be transmitted. With the metallic "belt", this problem has been overcome because it works under compression conditions instead of traction conditions.

The above mentioned metallic "belts" and the trunco-conical pulleys have provided an important improvement in the amount of the maximum power to be transmitted, in a continuous form in its speed variation, allowing an special application in the automotive field, In spite of it, the amounts of maximum power that has been transmitted are relatively low, so that these stepless transmissions can only be used on motor vehicles with low power engines,

SUMMARY OF THE INVENTION

The object of this invention is to provide of a stepless transmission, of mechanical constitution, that allows to increase, substantially, the amount of the maximum power that could be transmitted, with the undoubted advantages that represents on the automotive field.

On the one hand, it will allow to develop a stepless trnsmission to be fitted on motor vehicles with medium and low power engines, with a lower cost with respect to the present models, since they can be equipped with conventional "belts" traction working.

On the other hand, the stepless transmission application could be extended to passenger cars with high power engines, and in the same way to the commercial vehicles, as trucks, buses, etc, The present stepless transmission invention consists of traditional mechanical elements such as, "belt" and trunco-conical pulleys transmissions, gear wheel sets, e.g., epicyclic gears or planetary gears, synchro sleeves for gears selection, brakes and/or multidisc clutches, etc, and it is based on the fact that through the trunco-conical pulleys and the corresponding "belts", only is transmitted a fraction of the total power supplied by the vehicle engine, The present stepless transmission invention consists, at least, of a pair of trunco-conical pulleys with transmission flexible element or elements between them; a power transmission mechanism, preferably composed of an intermediate planetary gear, wich satellites carrier can be immobilized and one output planetary gear, The above mentioned trunco-conical pulleys are connected, one of them to the stepless transmission input shaft and the other one to the sun or to the crown gear of the intermediate planetary gear.

This intermediate planetary gear is connected through the free element, crown gear or sun, respectively, to one of the elements of the output planetary gear, i.e., with the satellites carrier, sun or crown gear. The other two elements of this second gear are connected, one of them to the input shaft and the other to the stepless transmission output shaft wich preferibly constitutes the input shaft of a conventional stepped gearbox.

With this constitution, only a fraction of the power supplied by the engine is transmitted by means of the present stepless transmission invention, through the pair of trunco-conical pulleys with their flexible transmission element or elements. The remaining power is transmitted directly through the output planetary gear.

The features and advantages of the present invention, just as they are stated in the claims, will now be described in detail with reference to the appended drawings showing several examples of the stepless transmission achievements of the present invention and their possible applications.

DETAILED DESCRIPTION OF THE INVENTION

Figure 1:
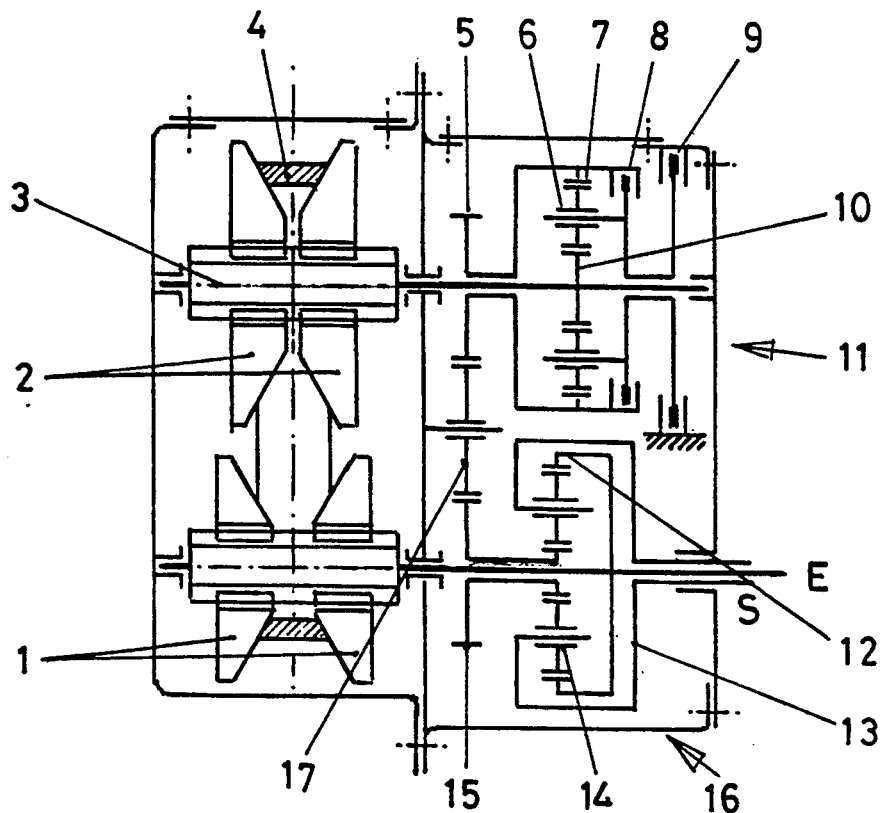
FIG. 1 is a schematic section of the stepless transmission basic element of the invention, henceforward will be designated as "Module of continuity and power deviation".

FIG. 1 shows the "Module of continuity and power deviation", the references numeral 1 and 2 indicate the variable transmission ratio pulleys, constituted by trunco-conical plates or pieces with a common shaft 3, with trunco-conical sufaces face to face to supply support to the "belt" 4. The reference numeral 5 indicates a gear wheel which is coaxial and interlocked to the gear crown 7 of an intermediate epyciclic gear 11. The reference numeral 6 indicates the satellites of the planetary gear set or epicyclic gear 11. The reference numeral 8 is a clutch which, when operating, interlocks the crown gear 7 to the satellites carrier of the epicyclic gear 11. The "Module of continuity and power deviation" also includes a brake, reference numeral 9 which, when operating, inmobilizes the satellites carrier of the epicyclic gear 11. In this gear, the reference numeral 10 indicates the sun which is coaxial and interlocked to the shaft 3. The references numeral 12 and 14 indicate the crown gear and the satellites of an output planetary gear, generally reference numeral 16. The satellites carrier of this second gear, has the reference numeral 13. The reference numeral 15 indicates a gear wheel that meshes an intermediate gear wheel 17, which, in his turn, meshes the gear wheel 5. Letter E indicates the input shaft, whereas letter S indicates the output shaft.

Figure 2:
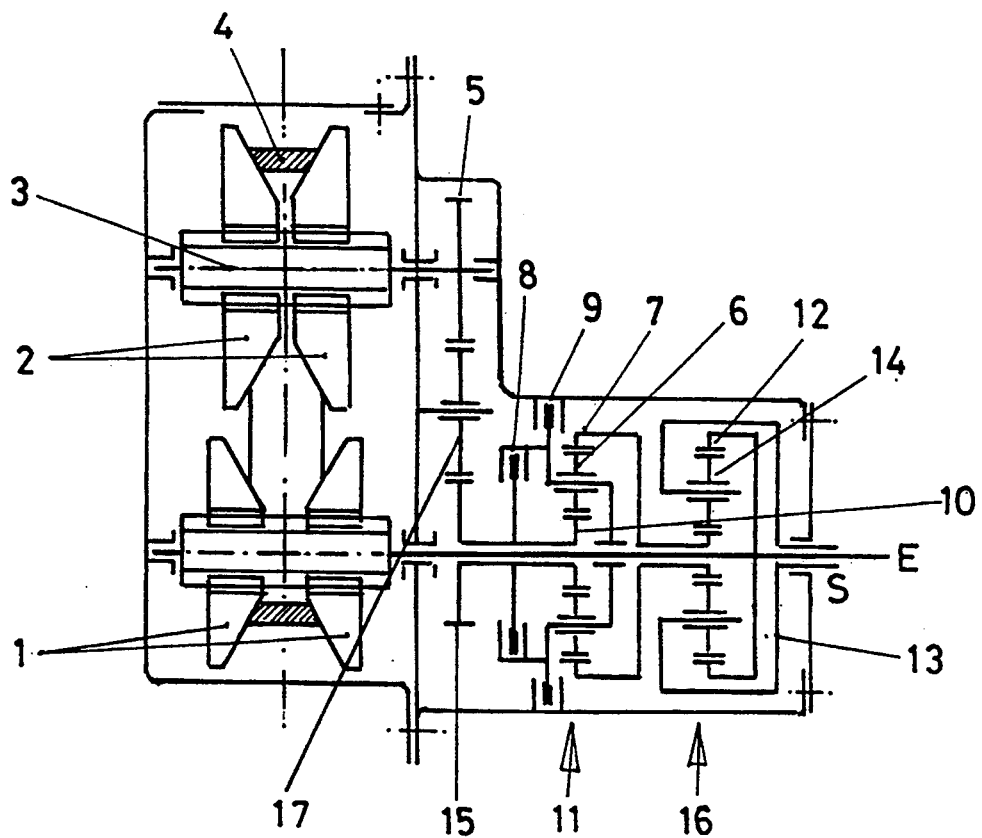
FIGS. 2 to 6, are similar views to FIG. 1 showing possible variations of the "Module of continuity and power deviation".

FIG. 2 corresponds to a similar achievement to the one described in FIG. 1, except that the gear wheel 5 is coaxial and interlocked to the shaft 3. Moreover, the sun 10 is coaxial and interlocked to the gear wheel 15.

The clutch 8 operates, in any case, between any two elements of the planetary gear, since it is well known, produces the same effect, that is to make equal the rotation speed of the three elements: the sun, the crown gear and the satellites carrier.

In FIG. 1, the two epicyclic gears shafts are parallel, whereas in FIG. 2 they are coaxial. In both achievements, the input and output shafts are coaxial.

Figure 3:
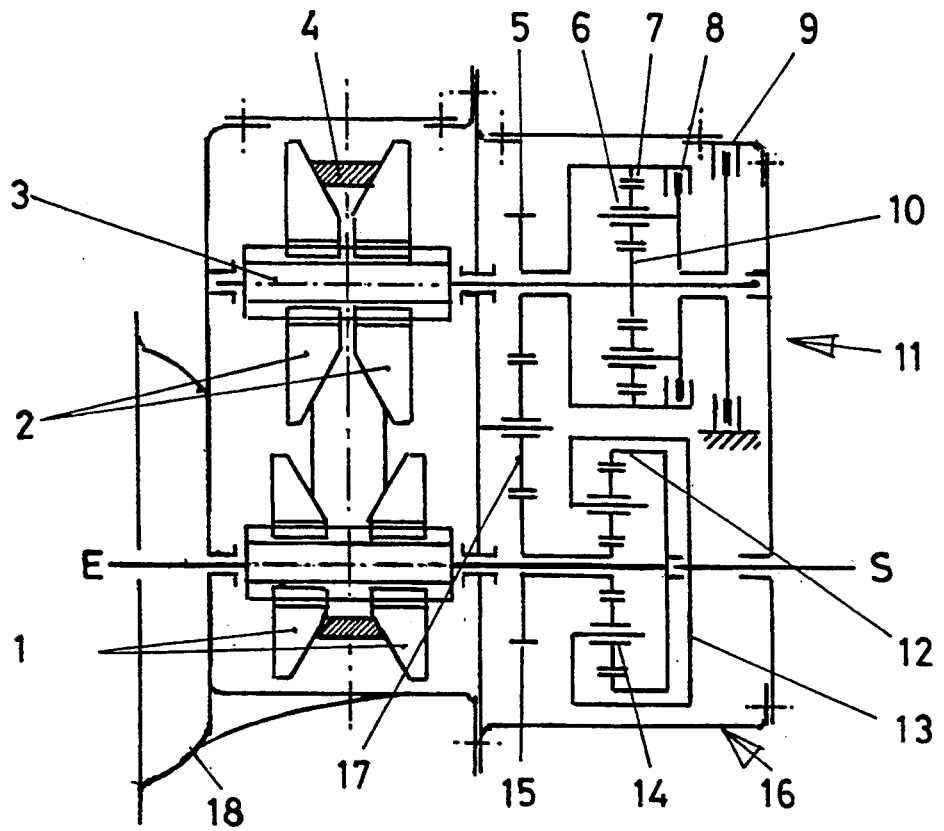

FIG. 3 shows the same arrangement as the one shown in FIG. 1. The same references are used in FIG. 3 as in the following Figures to indicate the same elements or components. The only difference between FIG. 3 with regard to FIG. 1 is that the input shaft E is placed on the shaft left side of the pulley 1.

Figure 4:
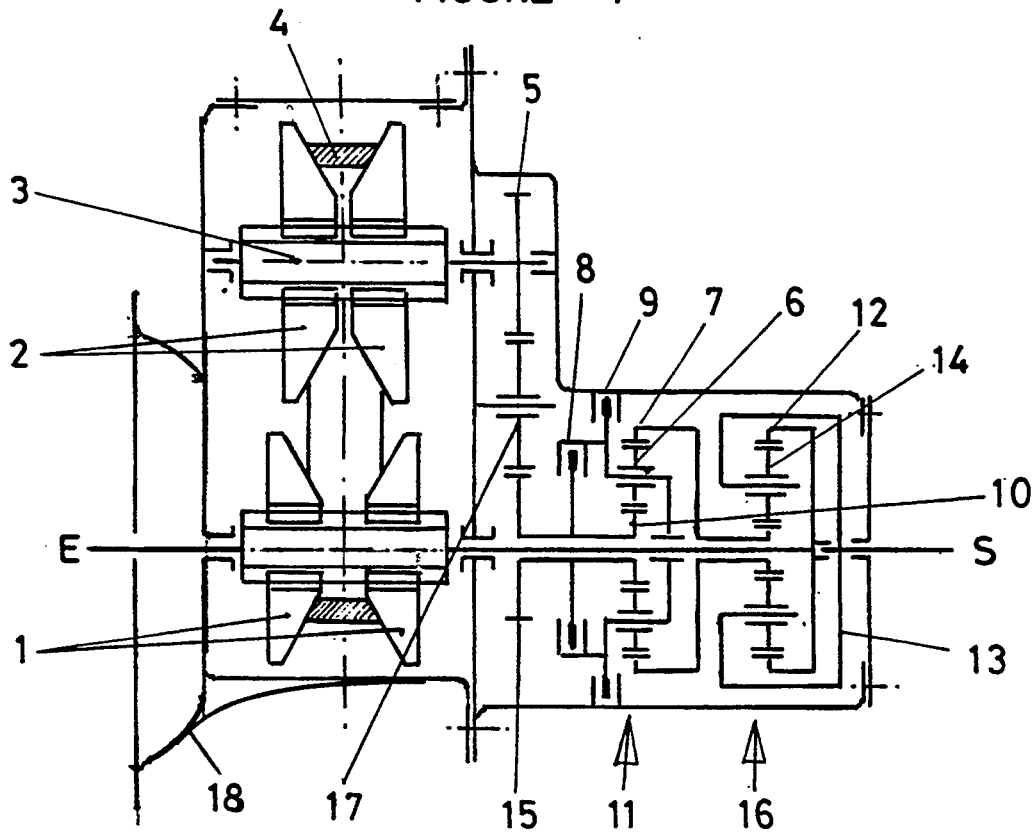

FIG. 4 shows the same achievement as the one shown in FIG. 2. The only difference between FIG. 4 with regard to FIG. 2 is that the input shaft E is placed on the left side of the pulley 1, In FIGS. 3 and 4, the reference numeral 18 indicates a housing to be fastened to the engine flywheel housing.

Figure 5:
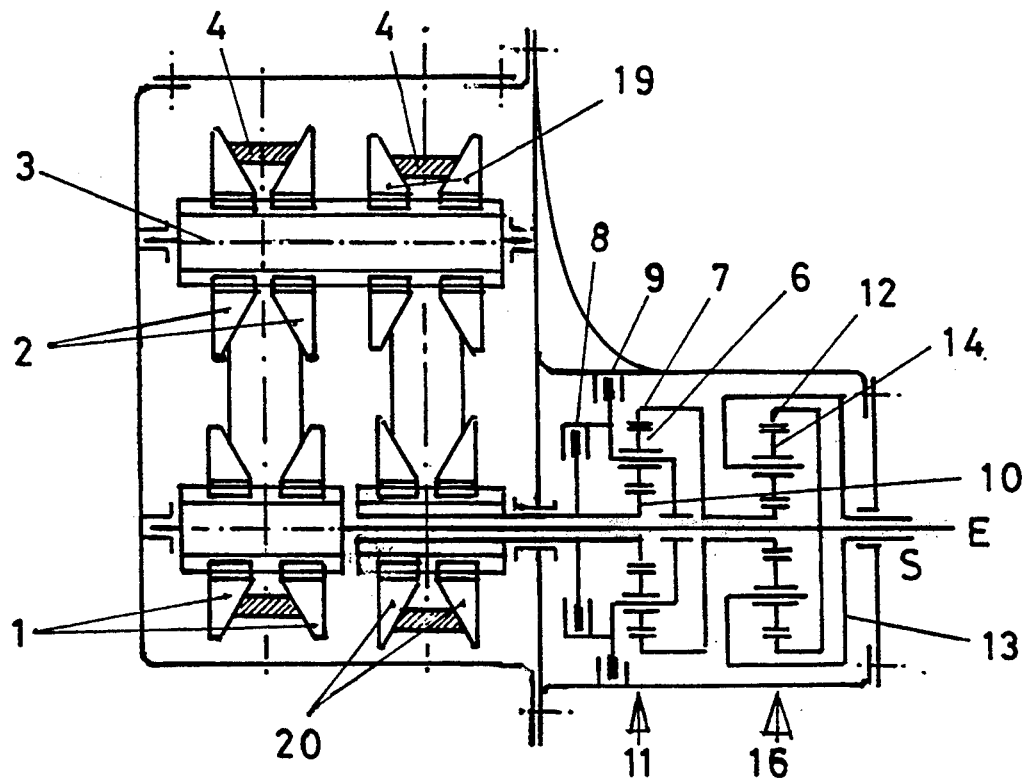

FIG. 5 achievement, is similar to the one shown in FIG. 2, but is different in that the gear wheel train that meshes between them, reference numeral 5, 15 and 17 have been deleted and another pulleys pair, reference numeral 19 and 20, have been added. The first of these pulleys, reference numeral 19, is equal to the reference numeral 1, whereas the pulley 20 is equal to the reference numeral 2. The rest, its constitution, operation and references correspond to the explanations exposed with respect to FIG. 2.

Figure 6:
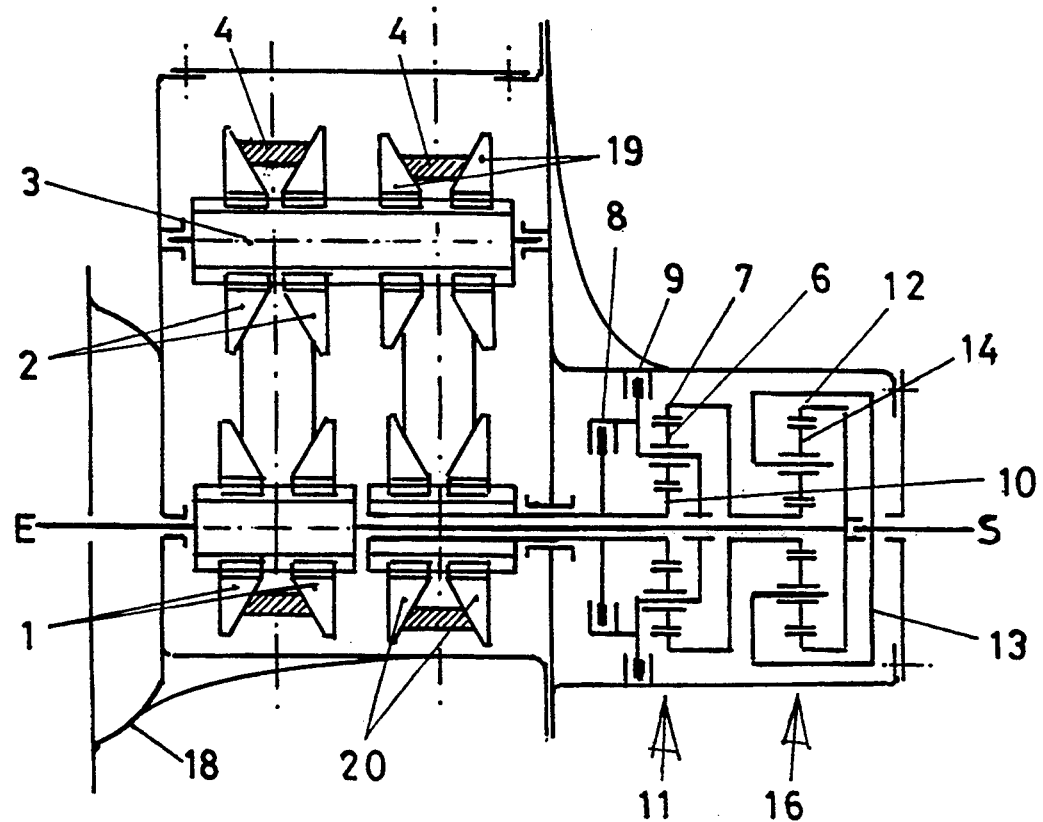

FIG. 6 achievement, is similar to the one shown in FIG. 4, but is different in that the gear wheel train that meshes between them, reference numeral 5, 15 and 17, have been deleted and in the same manner as in FIG. 5, another two pulleys, reference numeral 19 and 20, have been added.

Figure 7:
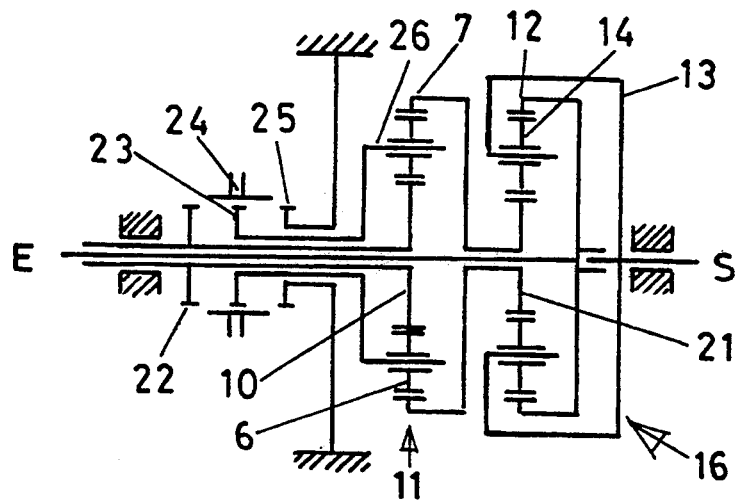
FIGS. 7 to 20, correspond to schemes of different epicyclic gear sets and trunco-conical pulleys for power transmission by means of "belt" that can be used in the present stepless transmission invention.
Figure 8:
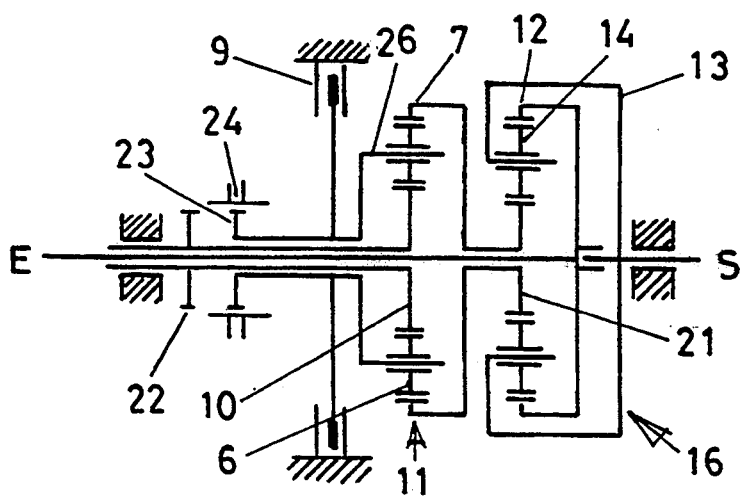
Figure 9:
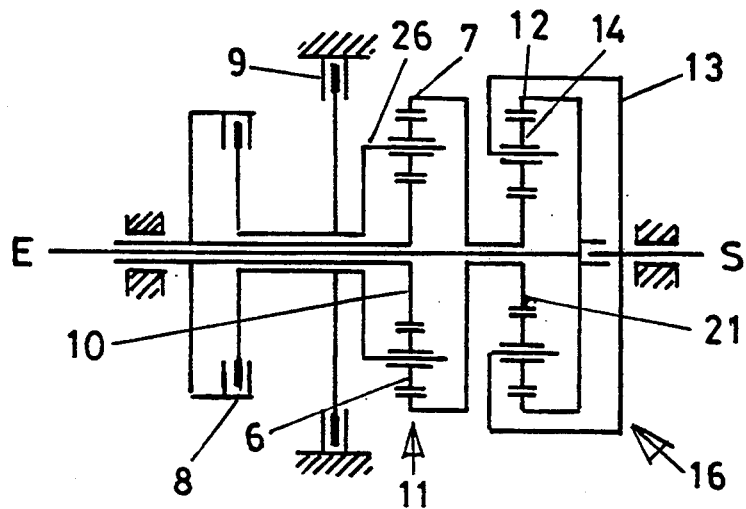

FIGS. 7, 8 and 9 represent the same set of the two epicyclic gears already described and with the reference numeral 11 and 16. The references numeral 6, 7 and 10 indicate, respectively, the satellites, the crown gear and the sun of the gear wheel 11, whereas the references numeral 14, 12 and 21 indicate, respectively, the satellites, the crown gear and the sun of the planetary gear 16. The reference numeral 22 indicates a training gear wheel, which is coaxial and interlocked to the sun 10. The reference numeral 23 indicates a training gear wheel, which is coaxial and interlocked to the satellites carrier 26 of the planetary gear 11. The reference numeral 24 indicates a inside indented sleeve and the reference numeral 25 indicates a fixed gear wheel. The sleeve 24 includes a synchronization mechanism to interlock the gear wheels 22 and 23 on its shift to the left or to interlock the gear wheels 23 and 25 on its shift to the right.

In FIG. 8, the sleeve 24, when is shifted to the left, interlocks the gear wheels 22 and 23. In FIG. 9, the references numeral 8 and 9 indicate, respectively, a clutch and a brake, as already indicated for FIGS. 1 to 6.

FIGS. 10 to 20, correspond to different sets of pulleys, gear wheels and epicyclic gears. The reference numerals indicated in these Figures have the meanings already explained for the above Figures. The reference numerals 27 and 28 of FIG. 10 indicate a pair of gear wheels which mesh between them. In the different Figures, the references numeral 29 and 30 indicate coaxial shafts, the second of wich is of tubular configuration. Also the reference numeral 31 indicates a hollow shaft of tubular configuration.

Figure 10:
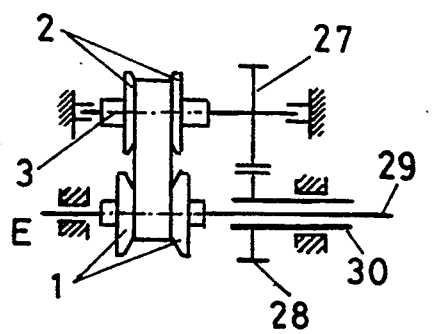
Figure 11:
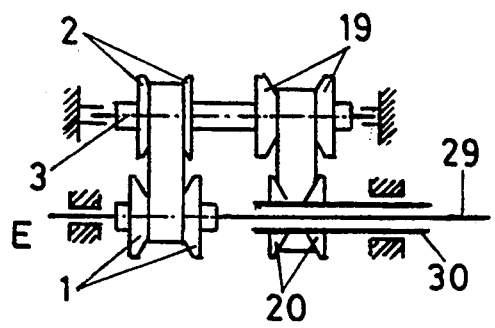
Figure 12:
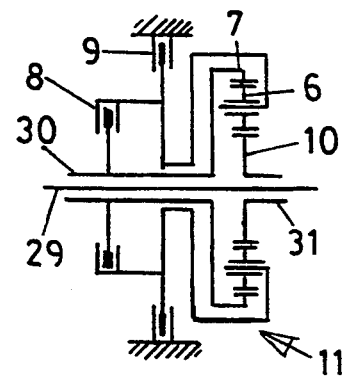
Figure 13:
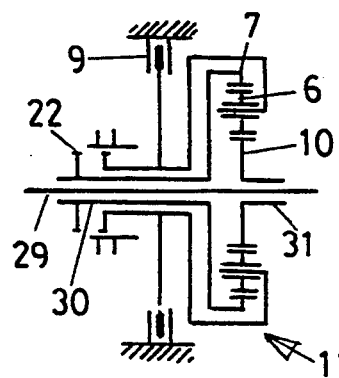
Figure 14:
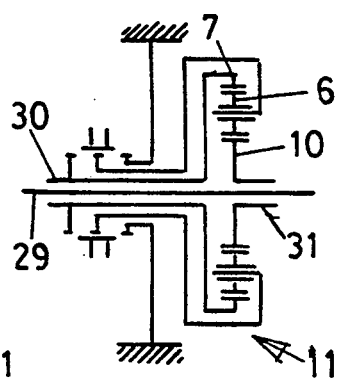
Figure 15:
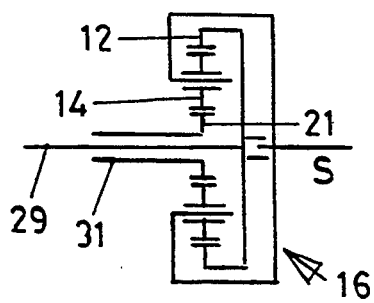
Figure 16:
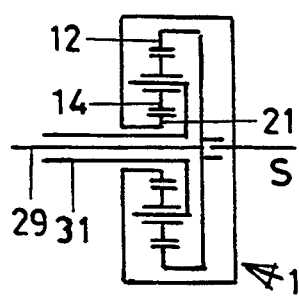
Figure 17:
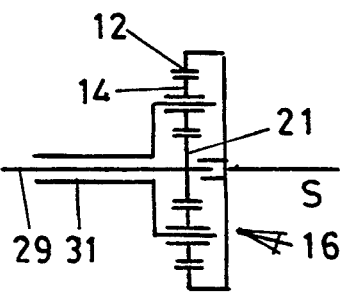
Figure 18:
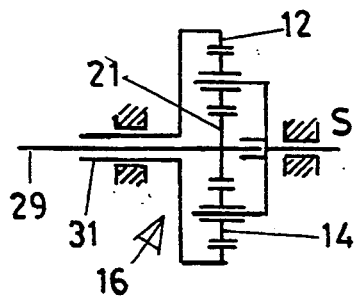
Figure 19:
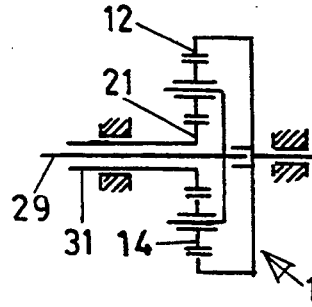
Figure 20:
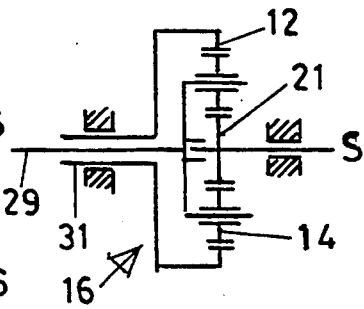

The combination of one of the two FIGS. 10 or 11 with one of the FIGS. 11, 13 6 14 and, finally, with one of the FIGS. 15 to 20, permits to dispose of a group of sets that constitutes, besides the group of sets already explained in the above Figures, a "Module of continuity and power deviation" as will be explained later.

Figure 21:
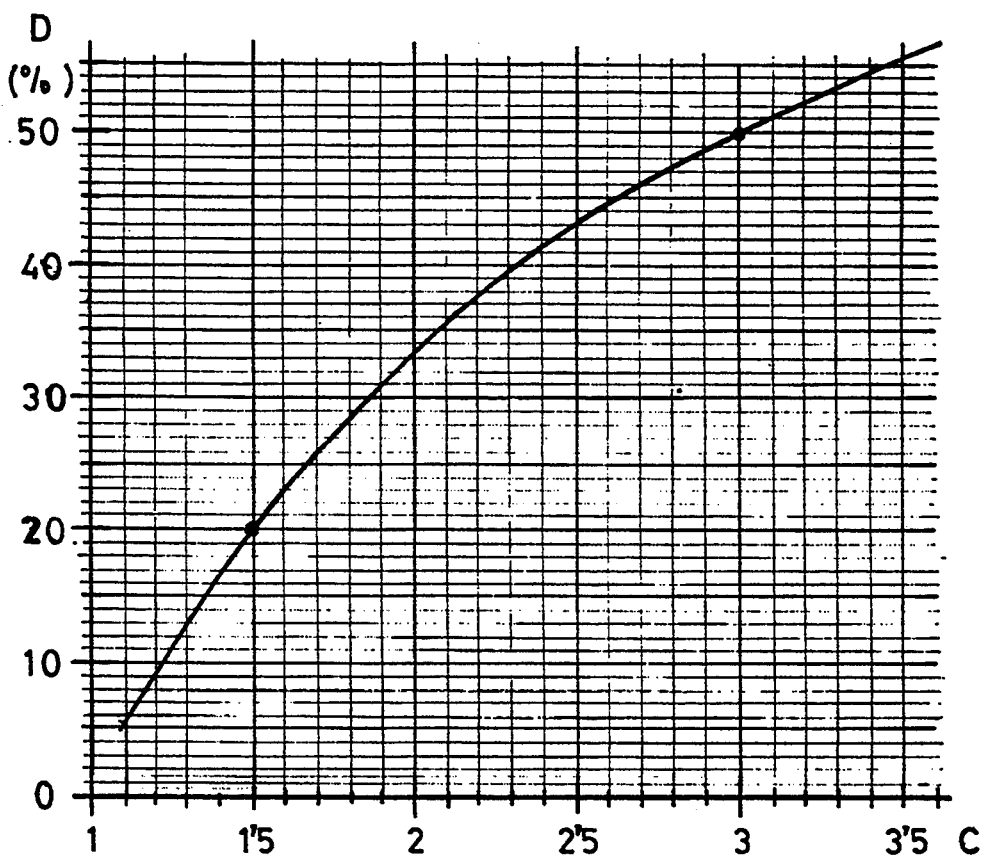
FIGS. 21 and 22 show graphically the "Module of continuity and power deviation" operation.

The diagram of FIG. 21 shows the amount of the maximum power transmitted through the pulleys of the "Module of continuity and power deviation", measured in percentage of the power supplied by the motor vehicle engine and that corresponds to the Y axis D, of this diagram, in function of the actuation field, C, which values are indicated in the X axis. C is the quotient between the maximum and the minimum values of the transmission ratio.

Figure 22:
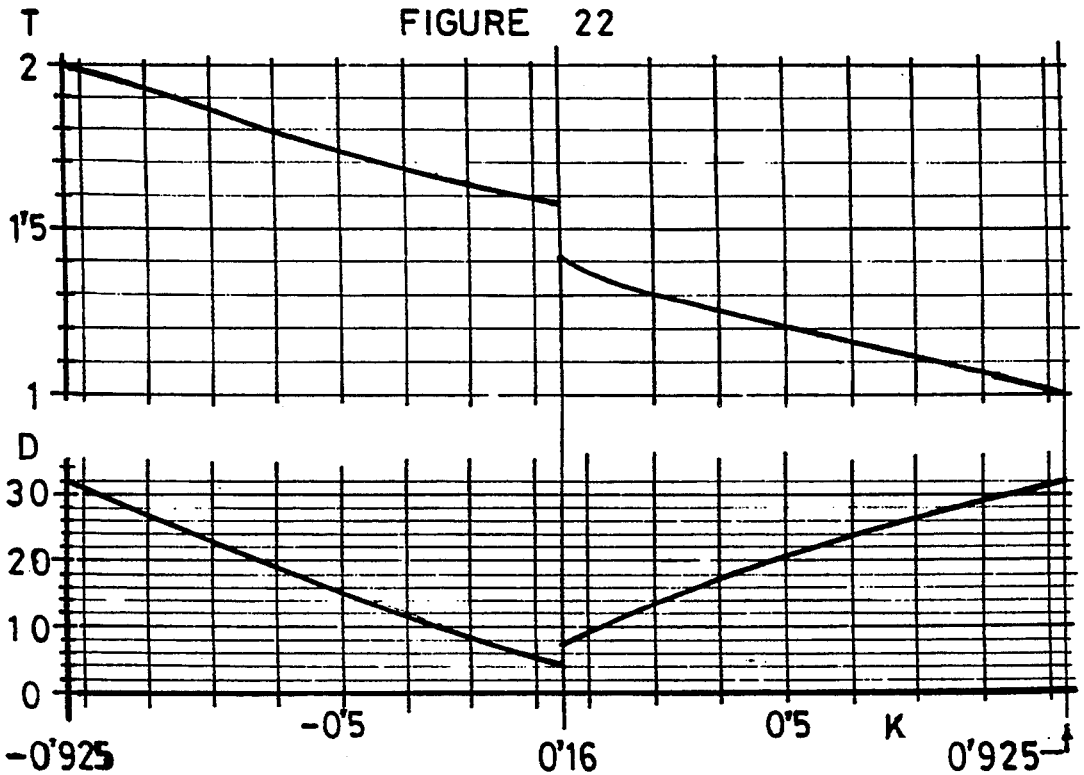

The diagram of FIG. 22 includes two graphics with a common X axis, where are represented the K values (transmission ratio of a pair of trunco-conical pulleys, i.e. the quotient between the arcs radii that the "belt" describes in each pulley). The lower diagram shows the power values D, as explained for the FIG. 21, whereas the upper diagram shows in the Y-axis the values T that is the transmisson ratio of the "Module of continuity and power deviation". These diagrams have been prepared for a prefixed values of parameters that define the epicyclic gears and trunco-conical pulleys, corresponding to one achievement example that later, when explaining the operation, wil be commented again.

Figure 23:
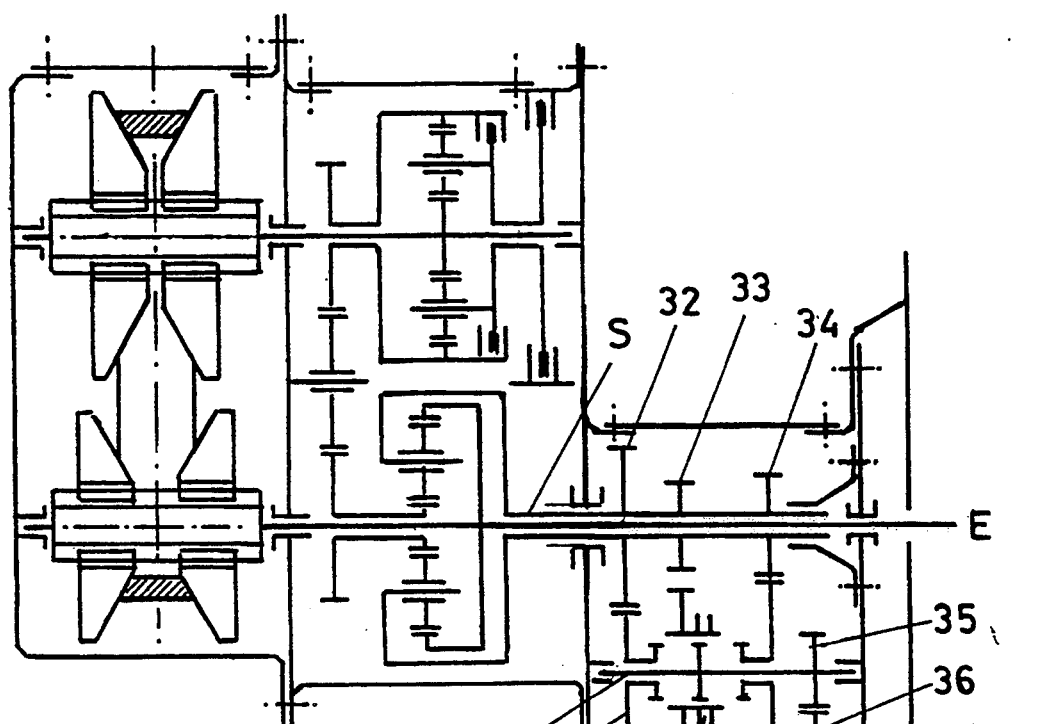
FIGS. 23, 25 and 26 are schematic sections of 5 achievements examples of stepless transmissions in accordance with the invention.

FIG. 23 represents, schematically, one example of the engagement of the "Module of continuity and power deviation" of FIG. 1 to a gearbox assembly, with two forward transmission ratios and one for the reverse gear. The set so constituted corresponds, for example, to a stepless transmission for a passenger car equipped with a transversal engine and front wheel traction. As in the above Figures, letters E and S indicate, respectively, the input and output shafts. The gear wheels 32, 33 and 34 are coaxial and interlocked to the shaft S. The gear wheels 35, 43, 45 and 46 are coaxial to the intermediate shaft, reference numeral 47. The gear wheel 32 meshes the gear wheel 46 and the gear wheel 46 and the gear wheel 34 mesh with the gear wheel 43. The pair of gear wheels 34 and 43 corresponds to the first gear and the pair of gear wheels 32 and 46 corresponds to the second gear. The reference numeral 44 indicates a sleeve with synchronization elements to select one of the two above gears. The gear wheel 45 meshes with an intermediate gear wheel (not illustrated) which, when also meshes with the gear wheel 33, permits to obtain the reverse gear. The gear wheels 35 and 36, meshing between them, form the output gear wheel train. Over the gear wheel 36 and in a coaxial and interlocked position with it, there is the satellites carrier 37 of a differential group, which outputs to operate the driving wheels are the references numeral 39 and 42. The references numeral 38 and 41 correspond to the planetary gears and the reference numeral 40 to the satellites of this differential group.

Figure 24:
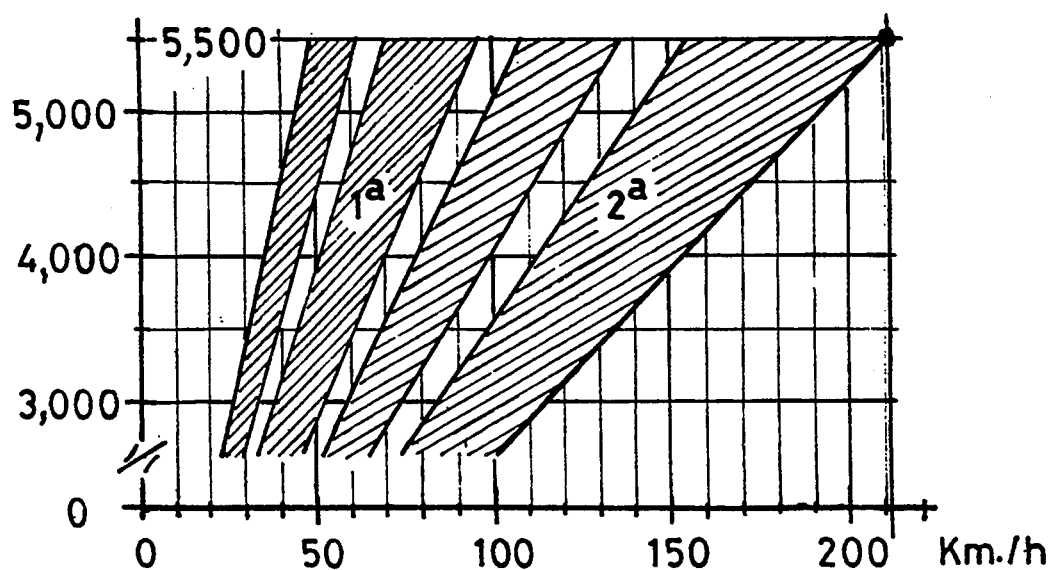
FIG. 24 corresponds to the kinematic operation diagram of the stepless transmission shown in FIG. 23, fitted on a passenger car with enough powered engine to reach a maximum speed of 210 km/h.

FIG. 24 shows the kinematic diagram of the stepless transmission shown in FIG. 23, fitted on a motor vehicle equipped with an engine with a maximum operating range of 5,500 r.p.m. Additional details on this example will be explained later.

Figure 25:
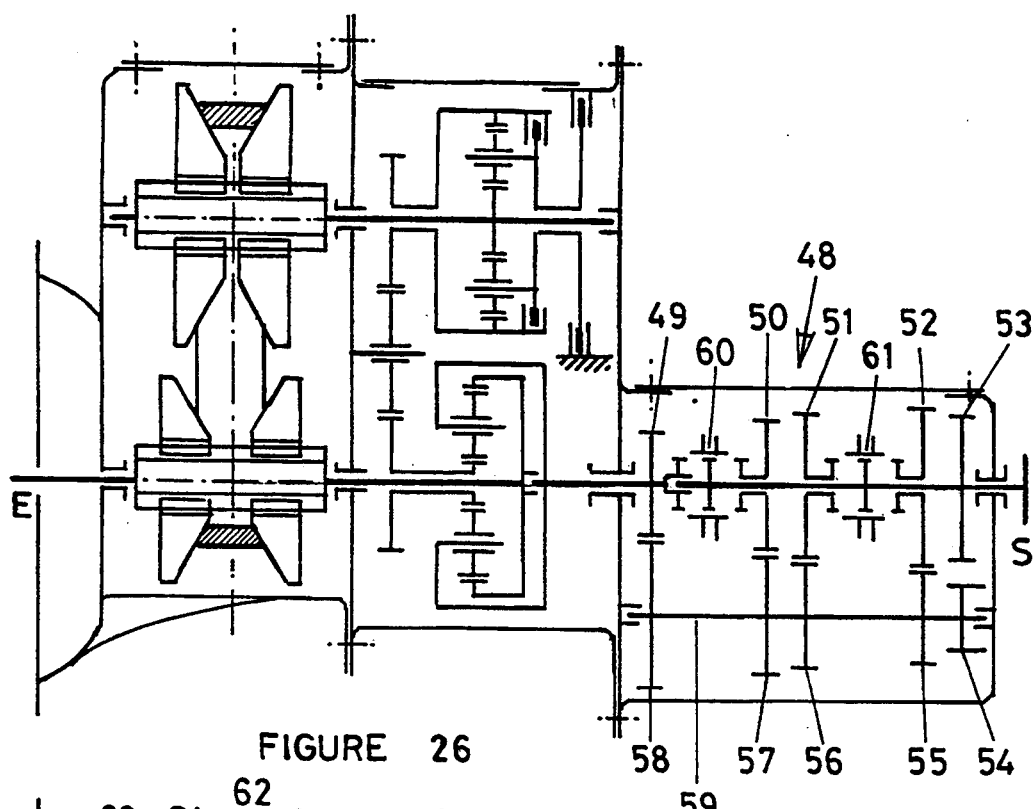

FIG. 25 is a schematic representation that corresponds to a stepless transmission integrated by the "Module of continuity and power deviation" of FIG. 3, with a conventional gear box achievement 48, four transmission ratios forward (i.e. four gears) and one reverse gear. The references numeral 49 and 58 indicate the gear wheels of the so called constant meshing train. The references numeral 52 and 55 indicate the gear wheel pair of the first gear; the references numeral 51 and 56 indicate the gear wheel pair of the second gear and the references numeral 50 and 57 indicate the gear wheel pair of the third gear. The fourth gear, i. e., the direct gear, is obtained by shifting the sleeve 60 to the left, so that, the shaft where is fitted the gear wheel 49, that is the input shaft to the conventional gearbox, and the output shaft S are interlocked. The reference numeral 60 indicates, therefore, the selector sleeve for the third and for the fourth gears, and the sleeve 61 allows to select the first and the second gears. Finally, the gear wheels pair 53 and 54 corresponds to the reverse gear (the intermediate gear wheel has not been represented in order to clarify the drawing). The reference numeral 59 indicates the intermediate shaft where are fitted coaxially and interlocked the gear wheels already described as references numeral 54, 55, 56, 57 and 58.

Figure 26:
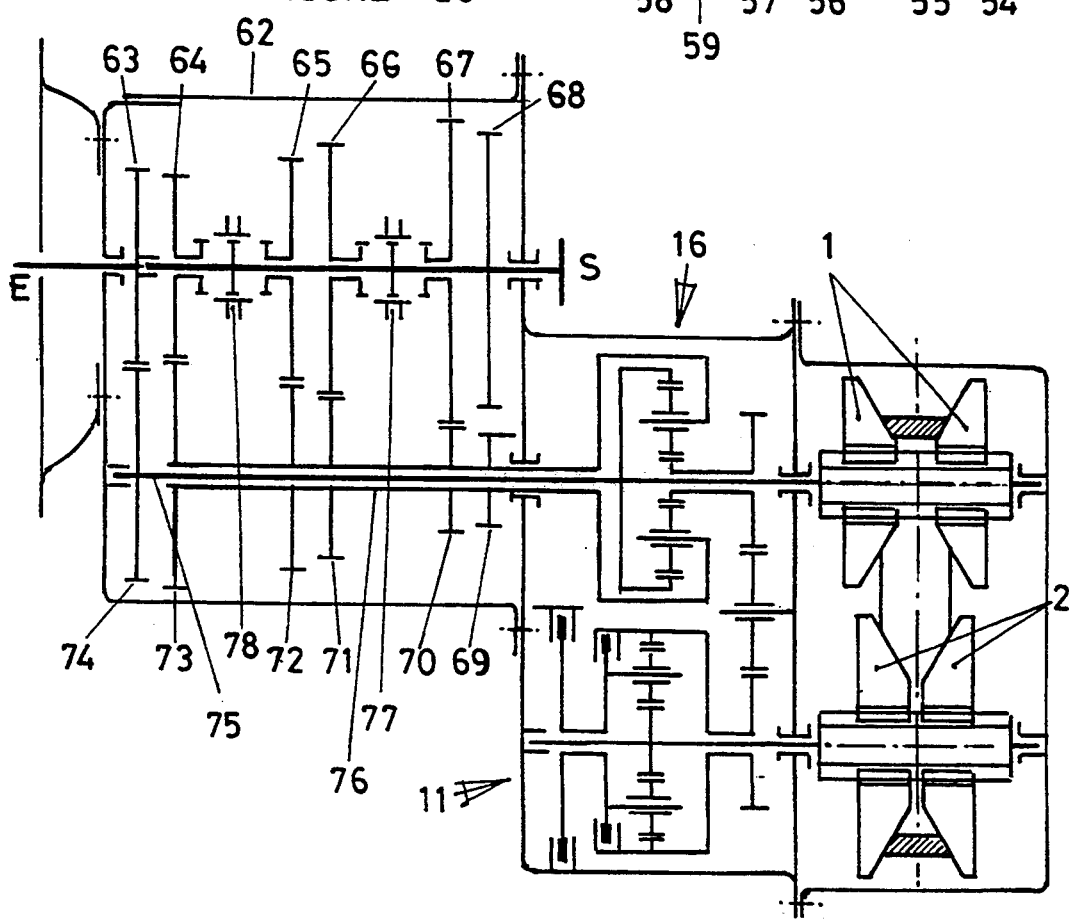

FIG. 26, as well as FIGS. 23 and 25, is a schematic representation that shows another example of a stepless transmission achievement. In this case, the stepless transmission is formed by the engagement of the gearbox 62 and the "Module of continuity and power deviation" of FIG. 1 (in a reversed position respect to the FIG. 1) where, only for clearness reasons, the truncoconical pulleys 1 and 2 and the epyciclic gears 11 and 16 of FIG. 1 have been represented. With respect to the assembly 62, letters E and S indicate, as always, the input and output shafts respectively. The gear wheels 63 to 68 are coaxial to the shafts E and S that are alined. On the other hand, the gear wheels 69 to 74 are coaxial to the shafts 75 and 76, wherein the second one is of tubular configuration and both are coaxial. The gear wheel 74 is coaxial and interlocked to the shaft 75 and the gear wheels 69 to 73 are coaxial and interlocked to the tubular shaft 76, which, in its turn, is coaxial and interlocked to the satellites carrier of the planetary gear 16. The references numeral 77 and 78 indicate the gear selector sleeves. The gear wheels pair 63 and 74 form the known meshing constant gear train; the remaining gear wheels pairs correspond to the following gears; the references numeral 70 and 67 for the first gear, the references numeral 66 and 71 for the second gear, the references numeral 65 and 72 for the third gear, the references numeral 64 and 73 for the fourth gear and the references numeral 68 and 69 for the reverse gear (the intermediate gear wheel, reverse gear characteristic, has not been represented).

Although it could be deduced from the above, it is convenient to outline that the essence of the present invention lies in the fact that the mechanical connection or connections among the different pieces elements and/or mechanical assemblies well known, as the pulleys, epyciclic groups, clutches, brakes, synchronization sleeves, gear selectors, etc. permit to dispose of one assembly, called "Module of continuity and power deviation", henceforward will be called, to abbreviate, "Module of continuity" that constitutes the fundamental and basic part of the present invention. Its engagement to gearboxes achievements, some of them are conventional, results in that the assembly in this way built up operates as a steplees transmission with the correct application field to be applied to the automotive industry or to the industry in general.

It is convenient then, to describe first the Module of continuity operation. The appended schematic drawings in FIGS. 1 to 6 are achievement examples in the same way as the assorted versions that can be obtained grouping together a assembly of FIGS. 10 and 11 with other one of the FIGS. 12, 13 and 14 and finally with another assembly taken among FIGS. 15 to 20. That is to say a total of $2 \times 3 \times 8 = 48$ variants, besides of those that can be derived from the FIGS. 7, 8 and 9, on which the Modules of continuity are based and already mentioned on FIGS. 1 to 6. FIGS. 3, 4 and 6 show adequated structures for longitudinal engines arrangements (that is the case in the commercial vehicles and in some passenger cars), whereas, FIGS. 1, 2 and 5 are preferred arrangements for cross engines assemblies (that is the most frequent case on passengers cars), although they can also be used for longitudinal engines arrangements, as the example showed in FIGS. 25 and 26 (the first one corresponds to a vertical section scheme and the second one to a horizontal section scheme). All these Nodules of continuity variations have a common basic feature that could be defined as a universal mechanical law that relates the maximum power D, that is directed through the trunco-conical pulleys (and that is a fraction of the power that arrives to the Module of continuity coming from the engine) with the operating field of the above mentioned Module of continuity, C, (that is the quotient between their higher transmission ratios, e.i. maximum and minimum values). This functional dependence is expressed by the following formula:

$$D = \frac{C-1}{C+1} \times 100$$

In which D is quantifed by the engine power percentage.

This formula has been deduced from the appropriate mathematical, kinematics and dynamics developments, submitted to that D is limited to a same maximum value for the rotations, in both rotative senses, of some of the elements of one of the epicyclic gears that are integrated in the Module of continuity; it has been assumed the hyphotesis of 100% on the mechanical efficiency of power transmission through the gear wheels and the trunco-conical pulleys. With reference to the so many repeated variety of the Modules of continuity, it must be understood that the Modules of continuity represented in FIGS. 1 to 6 (with clutch and brake or with syncronization sleeves or with sleeves and brake, as they are shown in FIGS. 7, 8 and 9) correspond to the most suitable functional achievements, taken into account the studies developed. FIG. 21 is the graphic translation of the above formula that relates D an C.

For the description of the Module of continuity operation and in order to make easy its understanding, FIG. 22 graphics must be considered (they have been made with practical values that define the planetary gears and the admissible diameters and reductions of the pulleys) and also the FIG. 1.

The variable K, represented in the common X-axle on the two graphicas of FIG. 22, indicates the quotient between the arcs radii embraced by the "belt" 4 in the trunco-pulleys 1 and 2 (see FIG. 1), Provided that, when the brake 9 operates, the rotation direction of the gear wheel 15 is reversed with respect to the shaft E and so the sun rotation direction of the epicyclic gear 16, it has been agreed to assigned negative values to K, to be able to differentiate it when the clutch 8 works instead of the brake 9. In this case, the rotation direction of the gear wheel 15 and the sun 16, is the same as the rotation direction of the input shaft E, then the positive sign corresponds to K in accordance with the above agreement. The Module of continuity works, in a such form that for each K value, the graphics of FIG. 22 produce the transmission ratio values T (that is the quotient between the E and S rotation speeds) and the power values D (percentage of the power operating on the shaft E, i.e., the engine power to wich is connected) that it is transmitted through the trunco-conical pulleys. When the brake 9 works, the maximum values of T and D are obtained when the radius of the "belt" 4 in the trunco-pulley 1 is the maximum (and minimum in the trunco-conical pulleys 2) and that in this example, the corresponding K value is, considering the above signs agreement, −0,925 and then T=2,008 and D=32,5 (these values are not indicated in FIG. 22 for clearness reasons). When the K value is the minimum, in this example K=−0,16, the T and D values are T=1,582 and D=4,43, which indicates that, if the brake 9 is maintained applied, the radius continuous variation of the "belt" 4 in the trunco-conical pulley 1, from its maximum value to its minimum value (and the corresponding radius increase of the "belt" 4 in the trunco-conical pulley 2, from its minimum value to its maximum value) results in that the T values are reduced from T=2,008 to T=1,582. When the brake 9 stops to operate, in the representative points corresponding to K=−0,16 and the clutch 8 starts to operate, the operation is such as the new K value to be considered (mantaining the minimum and maximum radii, respectively, for the belt 4 in the trunco-conical pulleys 1 and 2) is K=0,16, for wich, the value T=1,3998 and D=7,61, a continuity step is produced in the module transmission ratio value, wich value is 1,582/1,3998=1,13, i.e., a 13%, value that is perfectly admissible. With the mentioned clutch 8 applied, if the values of the radii of the "belt" 4 of the trunco-conical pulley 1 are increased from its minimum value to its maximum value (i.e. increasing the K values from 0,16 to 0,925), the T values are decreased from 1,3998 to 1,026, instead the power values of D are increased from the initial value D=7,61 to the maximum one D=32,3 (this last value is practically equal to the maximum value that corresponded to K=−0,925 for D=32,5). In short, the module transmission ratio has taken all the values, in a continuous manner, from the maximum value T=2,008 to the minimum one T=1,026 wich is equivalent to a actuation field C of value C=2,008/1,026=1,9571, whereas the power D has been mantained in values lower to 32,5% in all the interval of K variation, except in the point K=−0,925 in which D=32,5%. It is understandable that the association of this Module of continuity and a conventional gearbox achievement which transmission relations have numerical values in geometrical progression of ratio 1,9571, i.e., the corresponding value to the C operation field of the Module of continuity, results in the availability of a stepless transmission withouth steps or lacks of continuity. The function played by the mentioned brake 9 and clutch 8, can be replaced with the appropriate synchronization sleeves 24 shown in FIGS. 7 and 8. In FIG. 7, the shift of the synchronization sleeve 24 to the right side produces the locking of the satellites carrier 26 (this function is equivalent to the already mentioned function of the brake 9) and in its shift to the left side produces the interlocking of the satellites carrier 26 and the sun 10, which is equivalent to the clutch 8 operation. The speeds to achieve the connections of the above sleeve are admissible for its adequated operation. In FIG. 8 the clutch function is achieved by shifting the synchronization sleeve 24 to the left side and it is not possible the shift to the right side from the position of the training gear wheel 23, since here the brake 9 is mantained applied. FIG. 23 with the Module of continuity corresponding to the example used for the above explanation and with the gearbox, as indicated, with two transmissions relations forward, corresponds to a gearbox scheme for applications on passenger car equipped with cross engine and its kinematic behaviour is as shown in FIG. 24. In order to value its operation quality, it will be sufficient to consider that in the first gear there are two continuity areas of their tansmission relations, the first one comprised between the values 3,405 and 2,683 and the second one between the values 2,374 and 1,740; the step between them is 2,683/2,374=1,13, the same value, as it is obvious, that the discontinuity of the module operation. In the second gear there are also another two areas, one of them comprised between the values 1,549 and 1,221 and the other one between the values 1,08 and 0,791; (the step between them is 1,221/1,08=1,13. In short, the actuation field of this gearbox is 3,405/0,791=4,305 and the steps or discontinuity solutions among its four areas will be: 1,13:1,740/1,549 and 1,13. If the maximum power of the motor vehicle engine is, for example, 110 C.V., the maximum power transmitted through the trunco-conical pulleys of the Module of continuity is (32,5/100)×110=35,75 C.V. and the minimum one is (4,43/100)×110=4,873 C.V. For the above and assuming the hypothesis of equality of utilization times, it can be said that the deviated average power through the trunco-conical pulleys has a value of (33,75+4,873)/2=20,2965 C.V.≈20,3 C.V. In the case that an arrangement stepless transmission would been used, based on the trunco-conical pulleys without conection with epicyclic gears, i.e., just as the arrangements mentioned at the beginning, passenger car Fiat Uno Selecta or similar types, the transmitted power by the above trunco-conical pulleys would be 110 C.V.

If two pairs of trunco-conical pulleys were been used, instead of only one pair, just as the modules used of FIGS. 5 and 6 and the K values for each trunco-conical pulleys pair were be the same, anyway its lower value K=0,16, the discontinuity among adjacent areas corresponding to the mechanical relations 1st and the 2nd, would have the value 1,021 instead of the above mentioned value 1,13. That is to say, almost a complete continuity that, possibly and practically, is not worthwhile by the cost and complexity that involves.

Just before to finish this exposition, it is con venient to consider that the planetary gears 11 and 16 can always be defined in such a way that the value of the power deviation, D, can be the same practical maximum value for a same K value, corresponding to one or another sun rotation direction of the gear 16, i.e., the satellites carrier of 11 free or inmobilized, now for a brake now for a sliding synchronism sleeve. Naturally, the K maximum values can also be determined, one of them positive and the other one negative in accordance with the signs agreement already explained, in order to fulfil the values equality of the maximum power transmitted by the trunco-conical pulleys.

It is also convenient to outline that for motor vehicles equipped with high powered engines, it is possible to achieve a stepless transmission such as, through the trunco-conical pulleys of its Module of continuity could be deviated a maximum power value coming from the engine that not exceed the value of 58 C.V. mentioned at the beginnig of this memory, In fact, if for example the engine maximum power of the motor vehicle is 300 C.V. and it is necessary a value of 5,2 for the field of application of the stepless transmission (the present passenger cars have conventional gearboxes of five gears and such as their application fields, are placed, approximately, between 4 and 5,5), it is possible to define a stepless transmission, based in this invention patent such as the achievement that incorporates a conventional gearbox has only 3 transmission relations (instead of the present 5) and that through the trunco-conical pulleys of its Module of continuity can transmit a maximum power of 58 C.V. The kinematic diagram (passenger car speed and engine r.p.m.) would have three areas, each of them divided in two areas due to the Module operation discontinuity as it was already explained and such as, for example, the discontinuities between the extreme area, that corresponds to each mechanical transmission relation, and the adjacent area, will be 1,30 between the 1st and the 2nd gear and 1,24 between the 2nd and the 3rd gear. If a four transmission relations would be used instead of one of three conventional transmission relations arrangement and at priori were selected, a discontinuity steps, of the same values, between the adjacent areas of the kinematic diagram, 1,25, the maximum power deviated and transmitted by the trunco-conical pulleys would be 36,6 C.V. These values of 58 C.V and 36,6 C.V, for the above examples, would be converted in 58/3=19,33 C.V. and 36,6/3=12,2 C.V. respectively in the hypothesis that the maximum power of the engine of the passenger car in question was 100 C.V. All the above justifies all that has been exposed at the beginning of this memory; for medium and lower power engines, stepless transmissions can be buil-up using the trunco-conical pulleys and conventional "belts" traction operating and for higher power engines using the trunco-conical pulleys and the metallic "belts" developped by the Conpanies already mentioned, naturally with their previous oficial authorizations or the correspondent contracts, unless it was choosen the use of conventional achievements of the conventional gearbox, integrated on the stepless transmission, with a higher number of mechanical transmission relations in order to reduce, till achieve the appropiated value, the value of the maximum power deviated and transmitted by the trunco-conical pulleys. In both cases, obviously, based in this invention patent.

Figure 27:
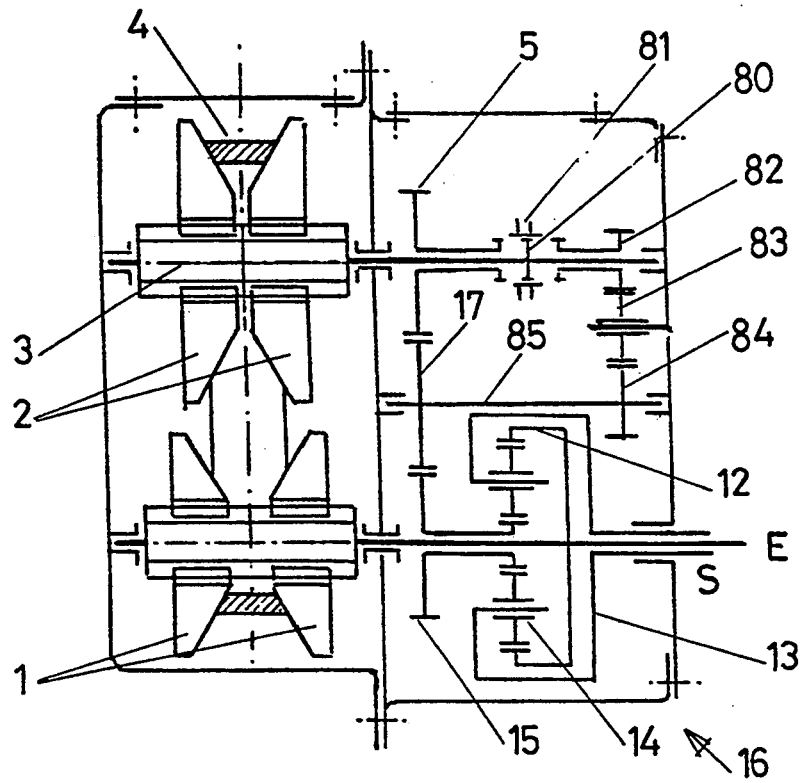
FIGS. 27 and 28 indicate two possible achievement variations on the "Module of continuity and power deviation".

FIG. 27 shows an achievement variation of the power transmission mechanism. This mechanism comprises a training gear wheel 80, that is interlocked to the shaft 3 and over which there is a sliding sleeve 81 with synchronization mechanism. Besides, on shaft 3 there are mounted a gear wheel 5 and a gear wheel 82, which can rotate freely with respect to the shaft 3, but they will be interlocked to the shaft 3 when the sleeve 81 shifts to mesh the coaxial training gear wheel that is coaxial and monopiece with the gear wheel 5, or with the training gear wheel that is coaxial and monopiece with the gear wheel 82.

Gear wheel 82 corresponds to the reverse gear of a conventional gearbox when meshes with an intermediate gear wheel 83 that, on its turn, meshes with the gear wheel 84 pressed-on the output shaft 85 that is interlocked to the gear wheel 17.

For the rest, the achievement shown in FIG. 27 corresponds to the achievement of FIG. 1.

Figure 28:
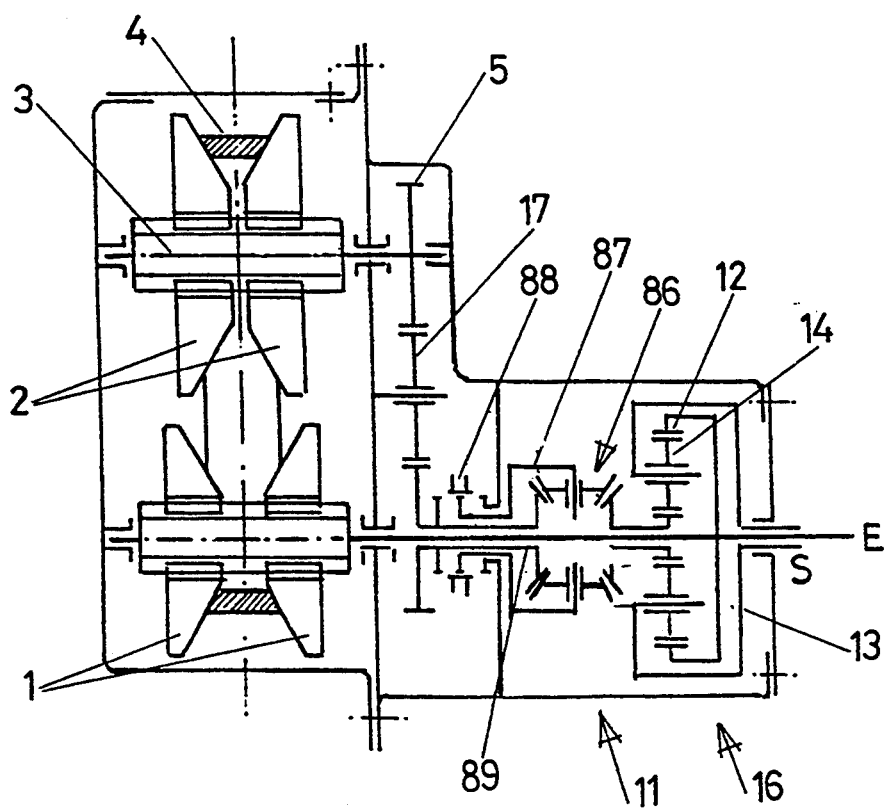

FIG. 28 shows a second way for the achievement of the power transmission mechanism. In this case, the mechanism comprises a differential group 86, wich satellites carrier 87 can be interlocked by shifting the appopriate sleeve 88 with training gearing and synchronism, in wich case the rotation direction of its output is overturned.

The above mentioned sleeve 28 has a position in which it interlocks the satellites carrier 87 to the differential mechanism input shaft 89, position that corresponds to the attached transmission relation. The remaining elements and loyauts correspond to the achievement showed in FIG. 2.

Taken into account that the nature of the invention has been described sufficiently as well as the method to do it practically, it must be outlined that the above mentioned and represented layouts in the appended drawings are capable of detail modifications whenever its fundamental principle remains unchanged.

I claim:

1. A stepless transmission for use with a continuously variable transmission (CVT) and a gear box operatively engaged with an engine of a motor vehicle, said gearbox having a first input shaft for receiving power from a first output shaft of the engine and a first output shaft from the gear box for driving a second input shaft of the gear box, said CVT having two pulleys, and said CVT operatively connected to the stepless transmission having a first sun-and-planet gear wherein said first pulley is driven by the first input shaft which drives a selected first crown gear or a satellite-carrier gear of the sun-and-planet gear, said selected gear being rotatable by said second pulley, and means for selectively rotating a first sun gear of the sun-and-planet gear in either of two directions of rotation;

wherein said first input shaft is simultaneously operatively engaged for rotation with either said first pulley or said second pulley of the CVT, and said input shaft of said gearbox; and wherein said selected first pulley or said second pulley transmits to said stepless transmission a maximum torque having a maximum torque no greater than a maximum torque produced by said engine.

2. A power continuity and derivation module according to claim 1, wherein a measure of torque transmitted by the pulleys is limited to a maximum value less than the measure of torque produced in the first output shaft.

3. A power continuity and derivation module according to claim 2, wherein the measure of torque transmitted by the pulleys is within the range of about 30% to about 40% of the measure of torque produced in the first output shaft.

4. A power continuity and derivation module according to claim 2, wherein the measure of torque transmitted by the pulleys is no greater than about 20% of the measure of torque produced in the first output shaft.

5. The stepless transmission of claim 1, wherein the non-driven CVT pulley drives a sun gear of a second planetary gear, said sun gear selectively operatively engaged through a clutch with said sun gear of said driven CVT planetary gear.

6. The stepless transmission of claim 5, wherein said sun gear is selectively operatively engaged for rotation in a forward direction and a reverse direction.

7. A stepless transmission for use with a continuously variable transmission (CVT) and a gear box operatively engaged with an engine of a motor vehicle, said gearbox having a first input shaft for receiving power from a first output shaft of the engine and a first output shaft from the gear box for driving a second input shaft of the gear box, said CVT having two pulleys, and said CVT operatively connected to the stepless transmission having a first sun-and-planet gear wherein said first pulley is driven by the first input shaft which drives a selected first crown gear or a satellite-carrier gear of the sun-and-planet gear, said selected gear being rotatable by said second pulley, and means for selectively rotating a first sun gear of the sun-and-planet gear in either of two directions of rotation;

wherein said first input shaft is simultaneously operatively engaged for rotation with either said first pulley or said second pulley of the CVT, and said input shaft of said gearbox;

wherein said selected first pulley or said second pulley transmits to said stepless transmission a maximum torque having a maximum torque no greater than a maximum torque produced by said engine; and wherein said means for selectively rotating the first sun gear comprises a second sun-and-planet gear having a second sun gear driven from the second pulley, and a second crown gear for driving the first sun gear wherein the satellite-carrier gear is selectively engaged or disengaged for rotation with the first sun gear at a corresponding angular velocity.

8. A stepless transmission for use with a continuously variable transmission (CVT) and a gear box operatively engaged with an engine of a motor vehicle, said gearbox having a first input shaft for receiving power from a first output shaft of the engine and a first output shaft from the gear box for driving a second input shaft of the gear box, said CVT having two pulleys, and said CVT operatively connected to the stepless transmission having a first sun-and-planet gear wherein said first pulley is driven by the first input shaft which drives a selected first crown gear or a satellite-carrier gear of the sun-and-planet gear, said selected gear being rotatable by said second pulley, and means for selectively rotating a first sun gear of the sun-and-planet gear in either of two directions of rotation;

wherein said first input shaft is simultaneously operatively engaged for rotation with either said first pulley or said second pulley of the CVT, and said input shaft of said gearbox;

wherein said selected first pulley or said second pulley transmits to said stepless transmission a maximum torque having a maximum torque less than a maximum torque produced by said engine; and wherein the means for selectively rotating the first sun gear comprises a gear selection sleeve for engaging one of two gears in a selected direction of rotation relative to the direction of rotation of the first sun gear.

9. A stepless transmission for use with a continuously variable transmission (CVT) and a gear box operatively engaged with an engine of a motor vehicle, said gearbox having a first input shaft for receiving power from a first output shaft of the engine and a first output shaft from the gear box for driving a second input shaft of the gear box, said CVT having two pulleys, and said CVT operatively connected to the stepless transmission having a first sun-and-planet gear wherein said first pulley is driven by the first input shaft which drives a selected first crown gear or a satellite-carrier gear of the sun-and-planet gear, said selected gear being rotatable by said second pulley, and means for selectively rotating a first sun gear of the sun-and-planet gear in either of two directions of rotation;

wherein said first input shaft is simultaneously operatively engaged for rotation with either said first pulley or said second pulley of the CVT, and said input shaft of said gearbox;

wherein said selected first pulley or said second pulley transmits to said stepless transmission a maximum torque having a maximum torque less than a maximum torque produced by said engine; and wherein the means for selectively rotating the first sun gear comprises a movable sleeve engaged with a differential sun-and-planet gear.

* * * * *